(12) United States Patent
Stiles, Jr. et al.

(10) Patent No.: US 9,555,352 B2
(45) Date of Patent: Jan. 31, 2017

(54) MODULAR PUMP AND FILTER SYSTEM AND METHOD

(75) Inventors: Robert W. Stiles, Jr., Cary, NC (US); Ryan Weaver, Winterville, NC (US); Brian Boothe, Raleigh, NC (US)

(73) Assignee: Pentair Water Pool and Spa, Inc., Cary, NC (US)

( * ) Notice: Subject to any disclaimer, the term of this patent is extended or adjusted under 35 U.S.C. 154(b) by 1060 days.

(21) Appl. No.: 13/327,588

(22) Filed: Dec. 15, 2011

(65) Prior Publication Data

US 2012/0152866 A1 Jun. 21, 2012

Related U.S. Application Data

(60) Provisional application No. 61/425,596, filed on Dec. 21, 2010.

(51) Int. Cl.
| | |
|---|---|
| *B01D 35/26* | (2006.01) |
| *B01D 29/23* | (2006.01) |
| *B01D 29/90* | (2006.01) |
| *E04H 4/16* | (2006.01) |
| *B01D 29/58* | (2006.01) |
| *E04H 4/12* | (2006.01) |
| *B01D 29/21* | (2006.01) |
| *B01D 29/54* | (2006.01) |

(52) U.S. Cl.
CPC .............. *B01D 35/26* (2013.01); *B01D 29/21* (2013.01); *B01D 29/23* (2013.01); *B01D 29/54* (2013.01); *B01D 29/58* (2013.01); *B01D 29/908* (2013.01); *E04H 4/1245* (2013.01); *E04H 4/1272* (2013.01); *E04H 4/16* (2013.01)

(58) Field of Classification Search
None
See application file for complete search history.

(56) References Cited

U.S. PATENT DOCUMENTS

| | | | | |
|---|---|---|---|---|
| 2,100,482 | A | * 11/1937 | Irwine | 210/354 |
| 2,448,157 | A | * 8/1948 | Schneider | 210/241 |
| 2,515,538 | A | * 7/1950 | Wall | 210/167.26 |
| 2,622,537 | A | * 12/1952 | Wortendyke | 417/423.14 |
| 2,641,455 | A | * 6/1953 | Poirot | 261/29 |
| 3,252,575 | A | 5/1966 | Jacuzzi | |
| 3,273,717 | A | * 9/1966 | Canterbury | 210/167.26 |
| 3,630,373 | A | * 12/1971 | Grazen | 415/198.1 |
| 3,637,331 | A | 1/1972 | Smith et al. | |

(Continued)

FOREIGN PATENT DOCUMENTS

| | | |
|---|---|---|
| CH | 614485 | 11/1979 |
| DE | 10233024 | 1/2004 |

(Continued)

*Primary Examiner* — Robert James Popovics
(74) *Attorney, Agent, or Firm* — Quarles & Brady LLP

(57) ABSTRACT

Embodiments of the invention provide a pump and filter system and method. The system includes a housing with a housing cavity and a filter cartridge, and a pump positioned in the housing cavity. The filter cartridge splits the housing cavity into a filtered region and an unfiltered region and the pump is located in the filtered region. The method includes operating the pump to pull fluid through a housing inlet into the unfiltered region, to pull fluid across the filter cartridge into the filtered region via suction pressure of the pump, and to force the fluid through the pump to a housing outlet.

6 Claims, 8 Drawing Sheets

(56) References Cited

U.S. PATENT DOCUMENTS

| | | | |
|---|---|---|---|
| 3,684,098 A * | 8/1972 | Bentley et al. | 210/374 |
| 3,685,919 A * | 8/1972 | Speck et al. | 415/56.4 |
| 3,695,447 A * | 10/1972 | Maestrelli | 210/332 |
| 3,736,075 A * | 5/1973 | Otto | 417/366 |
| 3,744,635 A * | 7/1973 | Horvath | 210/87 |
| 3,836,001 A * | 9/1974 | Heldreth | 210/167.01 |
| 3,859,214 A | 1/1975 | Lang et al. | |
| 3,864,262 A | 2/1975 | Lang et al. | |
| 3,898,157 A * | 8/1975 | Hooper | 209/306 |
| 3,920,352 A | 11/1975 | Speck et al. | |
| 3,949,578 A * | 4/1976 | Heldreth | 68/18 F |
| 3,969,248 A | 7/1976 | Whitmer | |
| 4,022,690 A | 5/1977 | Smith | |
| 4,039,453 A * | 8/1977 | Horvath | 210/167.25 |
| 4,043,914 A * | 8/1977 | Horvath | 210/167.26 |
| 4,053,262 A * | 10/1977 | Horvath | 417/423.14 |
| 4,130,488 A | 12/1978 | Speck et al. | |
| 4,134,836 A | 1/1979 | Rowley et al. | |
| 4,166,086 A * | 8/1979 | Wright | 261/93 |
| 4,349,434 A | 9/1982 | Jaworski | |
| 4,424,007 A * | 1/1984 | Mehrens et al. | 417/360 |
| 4,498,984 A | 2/1985 | Colson | |
| 4,545,906 A | 10/1985 | Frederick | |
| 4,574,048 A | 3/1986 | van den Broek | |
| 4,601,821 A * | 7/1986 | Sherman et al. | 210/282 |
| 4,622,137 A | 11/1986 | Kessler | |
| 4,657,636 A * | 4/1987 | Satomi | 162/261 |
| 4,801,376 A | 1/1989 | Kulitz | |
| 4,895,646 A * | 1/1990 | Willinger | 210/167.25 |
| 4,934,914 A * | 6/1990 | Kobayashi et al. | 417/423.3 |
| 5,006,238 A * | 4/1991 | Tominaga | 210/167.27 |
| 5,030,346 A * | 7/1991 | McEwen | 210/258 |
| 5,062,951 A * | 11/1991 | Tominaga | 210/167.23 |
| 5,120,437 A | 6/1992 | Williams | |
| 5,156,535 A | 10/1992 | Budris et al. | |
| 5,318,701 A * | 6/1994 | Wang | 210/167.21 |
| 5,322,622 A * | 6/1994 | Chiang | 210/167.25 |
| 5,336,401 A * | 8/1994 | Tu | 210/167.26 |
| 5,401,401 A * | 3/1995 | Hickok et al. | 210/167.27 |
| 5,449,454 A * | 9/1995 | Hickok | 210/188 |
| 5,972,210 A * | 10/1999 | Munkel | 210/90 |
| 6,013,178 A | 1/2000 | Strano et al. | |
| 6,270,324 B1 * | 8/2001 | Sullivan et al. | 417/420 |
| 6,572,765 B2 | 6/2003 | Lincke | |
| 6,659,717 B1 | 12/2003 | Kao | |
| 6,688,845 B2 | 2/2004 | Pages | |
| 6,746,219 B1 * | 6/2004 | Chen | 417/424.1 |
| 6,951,608 B2 | 10/2005 | Desjoyaux et al. | |
| 6,991,721 B2 | 1/2006 | Yuan | |
| 7,081,200 B2 | 7/2006 | Valls | |
| 7,144,504 B2 | 12/2006 | Tsai | |
| 7,531,092 B2 | 5/2009 | Hazlehurst | |
| 7,537,691 B2 | 5/2009 | Reid | |
| 8,349,172 B2 * | 1/2013 | Schoeb | 210/130 |
| 2004/0115078 A1 * | 6/2004 | Chen | 417/424.1 |
| 2006/0032801 A1 | 2/2006 | Reid | |
| 2006/0083630 A1 | 4/2006 | Chen | |
| 2007/0154319 A1 | 7/2007 | Stiles, Jr. et al. | |
| 2008/0190870 A1 | 8/2008 | Schoeb | |
| 2009/0089959 A1 | 4/2009 | Lee et al. | |
| 2012/0152866 A1 * | 6/2012 | Stiles, Jr. | B01D 29/21 210/808 |

FOREIGN PATENT DOCUMENTS

| | | |
|---|---|---|
| EP | 0017974 | 10/1980 |
| EP | 0544610 | 6/1993 |
| EP | 1267085 | 12/2002 |

* cited by examiner

MODULAR PUMP AND FILTER SYSTEM AND METHOD

RELATED APPLICATIONS

This application claims priority under 35 U.S.C. §119 to U.S. Provisional Patent Application No. 61/425,596 filed on Dec. 21, 2010, the entire contents of which is incorporated herein by reference.

BACKGROUND

Conventional pool filtration systems include a filter in fluid communication with a pump. The filter is often housed in a separate filter housing downstream from the pump. The pump creates a pressure vessel in the filter housing by pushing water into the filter housing and through the filter. The pump's impeller is often subject to interaction with debris from the pool that bypasses relatively course openings of the pump's preliminary debris basket. The debris can cause damage to pump's components limiting the longevity of the pool filtration system.

SUMMARY

Some embodiments of the invention provide a pump and filter system including a housing with a housing inlet, a housing outlet, and a housing cavity. The system also includes a first filter cartridge positioned inside the housing cavity and a pump positioned inside the housing cavity and substantially surrounded by the first filter cartridge. The pump includes a pump inlet and a pump outlet. The pump inlet is separated from the housing inlet by the first filter cartridge, and the pump outlet is in direct communication with the housing outlet.

Some embodiments of the invention provide pump and filter system with a filter cartridge positioned within the housing cavity and substantially splitting the housing cavity into an unfiltered region adjacent to the housing inlet and a filtered region adjacent to the housing outlet. The system also includes a pump positioned within the filtered region of the housing cavity.

Some embodiments of the invention provide a method for filtering fluid from an aquatic application. The method includes providing a housing with an inlet, an outlet, and a housing cavity. The method also includes splitting the housing cavity into a filtered region and an unfiltered region with a filter cartridge, and positioning a pump in the filtered region of the housing cavity. The method further includes operating the pump to pull the fluid from the aquatic application through the housing inlet into the unfiltered region, to pull the fluid across the filter cartridge into the filtered region via suction pressure of the pump, and to force the fluid through the pump to the housing outlet.

DETAILED DESCRIPTION

Figure 1:
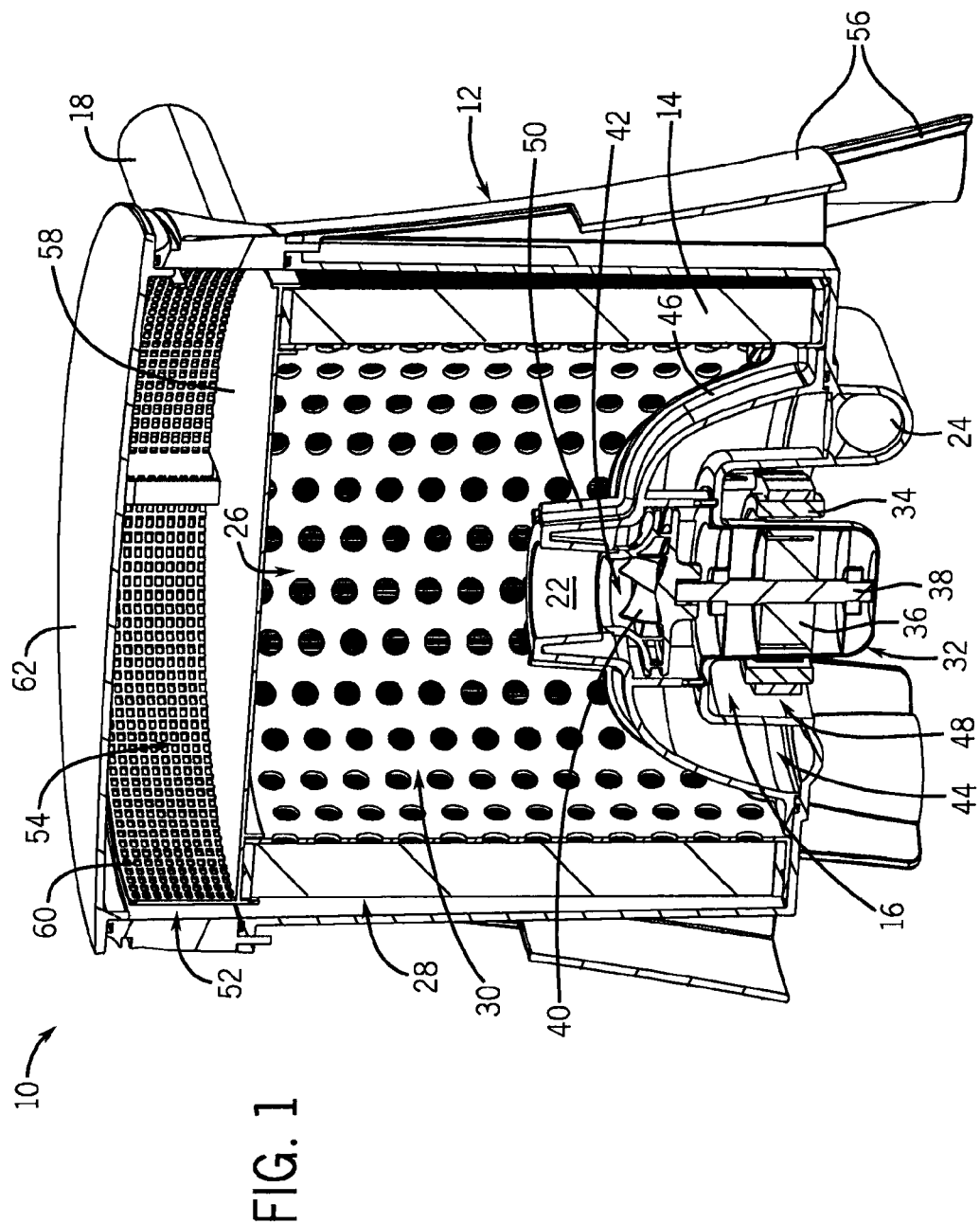
FIG. 1 is a cross-sectional perspective view of a pump and filter system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 2:
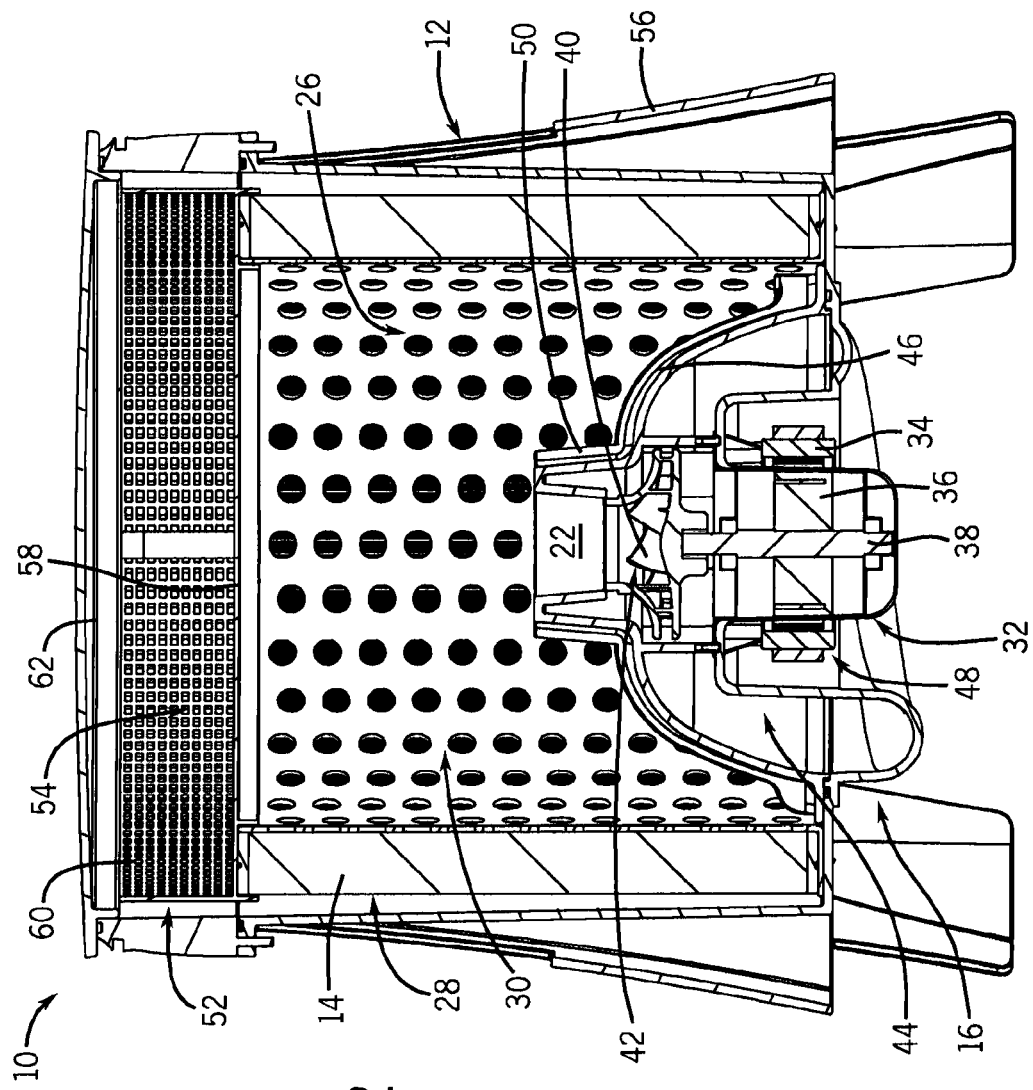
FIG. 2 is another cross-sectional view of the pump and filter system of FIG. 1.
Figure 3:
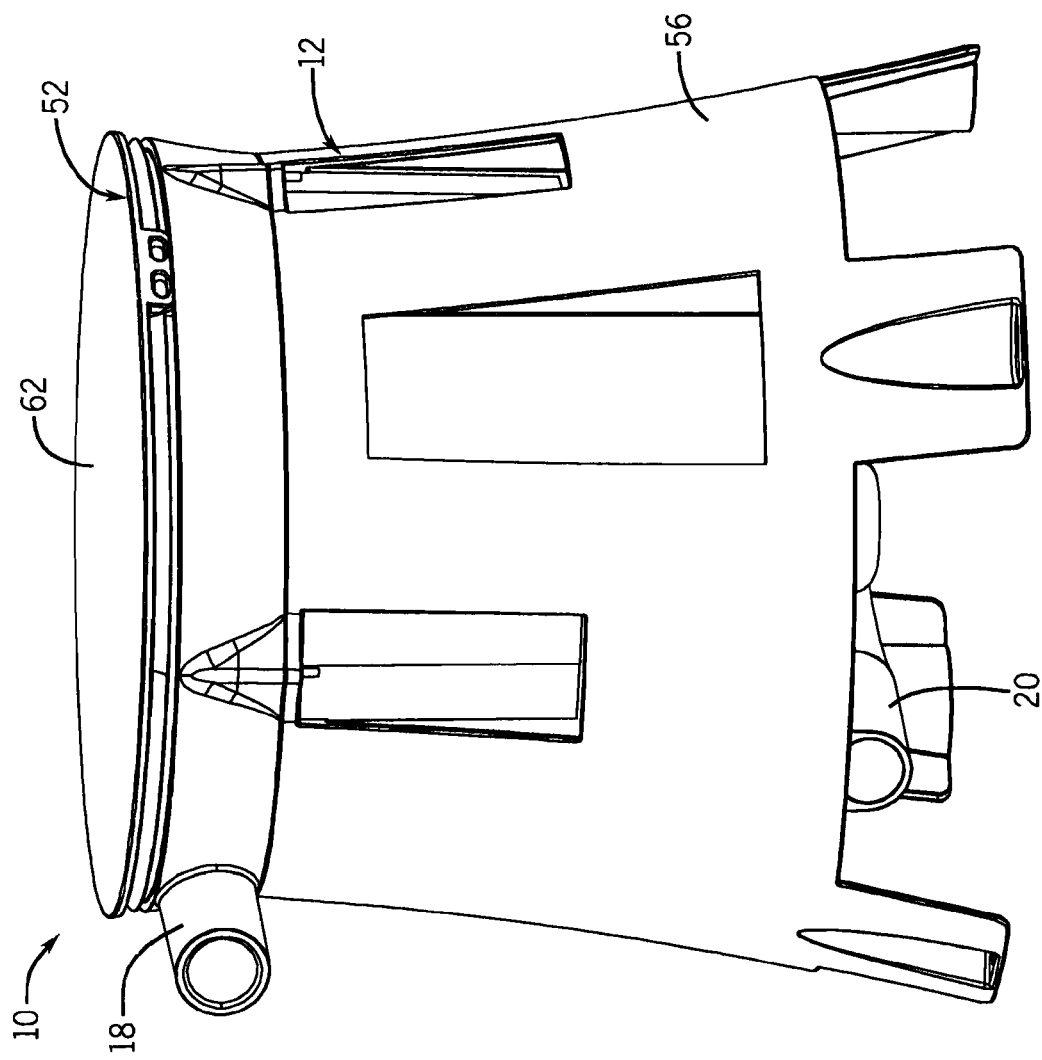
FIG. 3 is an outer perspective view of the pump and filter system of FIG. 1.

FIGS. 1-3 illustrate a pump and filter system 10 according to one embodiment of the invention. The system 10 can include a housing 12, a filter cartridge 14, and a pump 16. The housing 12 can include a housing inlet 18 and a housing outlet 20 (as shown in FIG. 3), and the pump 16 can include a pump inlet 22 and a pump outlet 24. In some embodiments, the system 10 can be used with an aquatic application, for example as a filtration system for a swimming pool or spa. In one embodiment, the housing inlet 18 can be in fluid communication with (e.g., directly or indirectly coupled to) a drain or skimmer of a swimming pool (not shown) and the housing outlet 20 can be in fluid communication with a supply inlet of the swimming pool. The swimming pool can be an above-ground or an in-ground swimming pool in some embodiments.

As shown in FIGS. 1 and 2, the housing 12 can enclose the filter cartridge 14 and the pump 16. The filter cartridge 14 can be substantially cylindrical and the pump 16 can be located inside the filter cartridge 14. As a result, the filter cartridge 14 can substantially separate the housing inlet 18 from the pump inlet 22. The pump outlet 24 can be directly coupled to the housing outlet 20. In addition, as shown in FIGS. 1-3, the housing inlet 18 can be located substantially above the housing outlet 20.

The filter cartridge 14 can be positioned in a housing cavity 26 of the housing 12 and can separate the housing cavity 26 into an unfiltered region 28 outside of the filter cartridge 14 (i.e., between the filter cartridge 14 and inside walls of the housing 12) and a filtered region 30 inside of the filter cartridge 14. The pump 16 can be at least partially located in the filtered region 30 of the housing cavity 26 and can be substantially surrounded by the filter cartridge 14, and the filtered region 30 can be substantially "downstream" from the unfiltered region 28. For example, during operation, the pump 16 can pull fluid through the housing inlet 18 into the unfiltered region 28 and across the filter cartridge 14 into the filtered region 30. More specifically, the pump system 10 can act as a suction vessel by "pulling" water through the filter cartridge 14, as opposed to conventional filtration systems that "push" water through a filter (i.e., creating a pressurized vessel).

Figure 4:
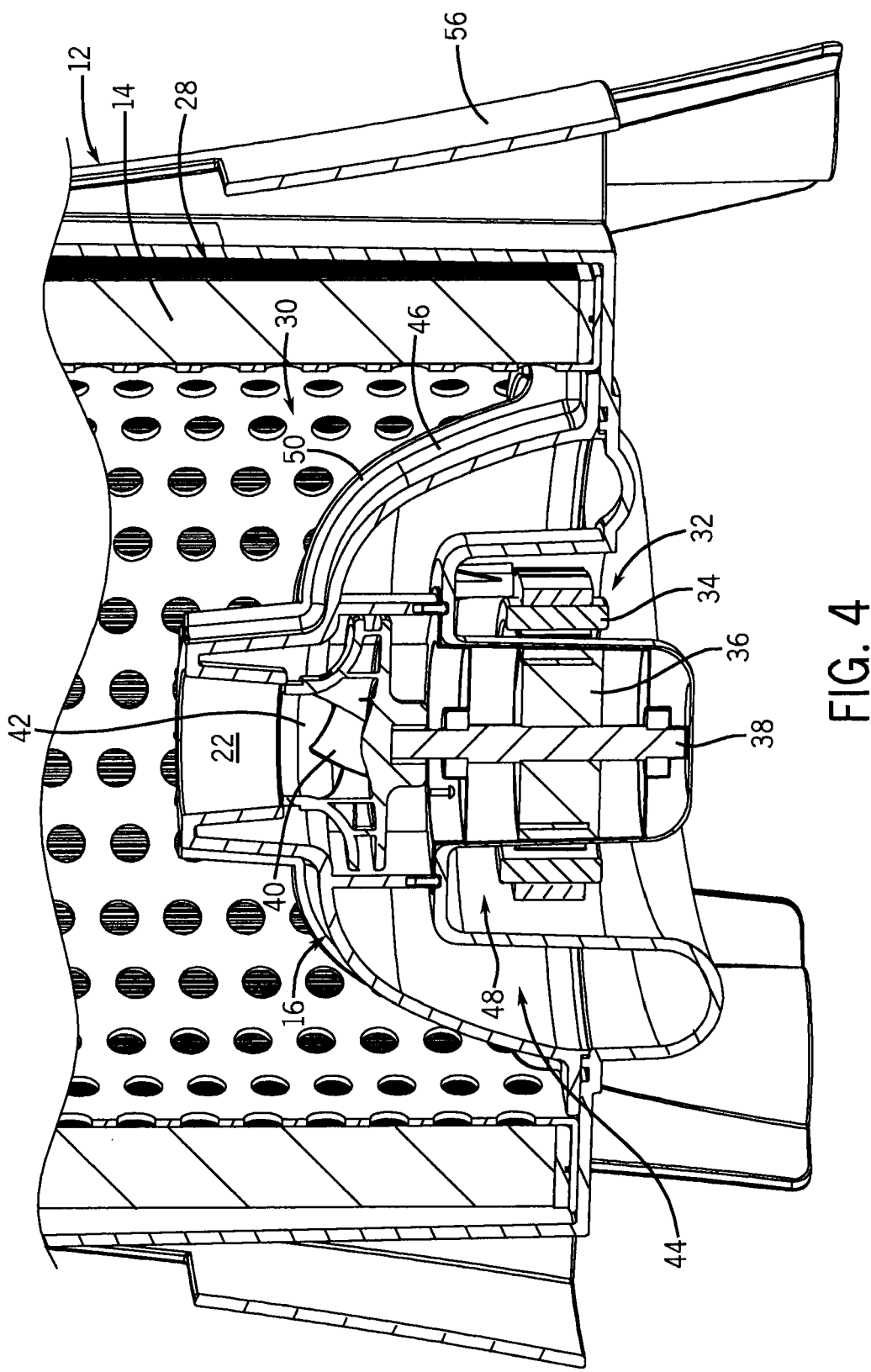
FIG. 4 is a cross-sectional view of a pump for use with the pump and filter system of FIG. 1.

In some embodiments, the pump 16 can be a variable speed, variable flow, or multispeed pump. In other embodiments, the pump 16 can be a single speed pump or a two speed pump. As shown in FIGS. 1, 2, and 4, the pump 16 can be positioned in a vertical orientation and can include a magnetic drive motor 32 with a stator 34, a rotor 36, and a rotor shaft 38. The pump 16 can also include an impeller 40 coupled to the rotor shaft 38. The impeller 40 can be positioned in a pumping cavity 42 near the pump inlet 22 in order to pump fluid into a volute 44 (e.g., an outlet cavity) and through the pump outlet 24. The volute 44 can include a spiral geometry to provide minimal flow resistance and optimal flow movement of fluid from the impeller 40 to the pump outlet 24. In some embodiments, a pump housing 46, which can at least partially form the pumping cavity 42 and the volute 44, can be an integral part of the housing 12. Also, in some embodiments, as shown in FIGS. 1, 2, and 4, the pump housing 46 can include ribs 50, for example to add structural strength to the pump housing 46.

In addition, in some embodiments, at least the stator 34, the rotor 36, and the rotor shaft 38 can be at least partially housed within a motor cavity 48, and the rotor shaft 38 can extend into the pumping cavity 42 so that it can be coupled to the impeller 40. In some embodiments, the pump 16 can include one or more seals to prevent fluid from leaking out of the pumping cavity 42 into the motor cavity 48 and contacting other components of the motor 32 (e.g., a "dry" rotor design). In this manner, the motor cavity 48 can remain substantially dry during operation of the pump 16.

In other embodiments, as shown in FIGS. 1, 2, and 4, the rotor 36 and the rotor shaft 38 can be positioned within the motor cavity 48 and can be in fluid communication with the pumping cavity 42 (e.g., a "wet" rotor design). The stator 34 can be positioned outside the motor cavity 48 and can be sealed from the pumping cavity 42. Also, as shown in FIGS. 1, 2, and 4, the motor cavity 48 can be located near a lower portion of the system 10. As a result, the motor cavity 48 can be accessible through the underside of the system 10 for motor maintenance or replacement. In some embodiments, the motor cavity 48 can be formed by a portion of the housing 12.

In some embodiments, operation of the pump 16 (e.g., on/off control and/or speed control of the motor 32) can be controlled by a controller (not shown). The controller can be used to operate the pump 16, for example a variable speed pump, in order to schedule pump on/off times, as well as control flow through pump system 10 by controlling the speed of the motor 32. These operations can prevent the pump 16 from constantly operating at full speed, which may be unnecessary in certain situations. As a result, the scheduling and speed control operations can increase the efficiency of the system 10, lengthen the life of the system 10 (including the motor 32, the pump 16, and/or the filter cartridge 14), and reduce the operating costs of the system 10.

As described above, the pump 16 can be located in the filtered region 30. As a result, the fluid flowing through the pump 16 has already passed through the filter cartridge 14 and can be substantially filtered from debris which may cause damage to the impeller 40 or other components of the pump 16. Due to the pump 16 pumping filtered fluid, pump durability and pump life can be increased in comparison to pumps in conventional pressurized vessel filtration systems that pump unfiltered fluid. For example, conventional pressurized vessel filtration systems include a debris basket that removes larger debris and particulate matter. These debris baskets can include mesh geometries in the centimeter range, allowing a substantial amount of particulate matter to reach the pump. The filter cartridge 14 of the system 10 can include filtration media with mesh geometries in the micron range in order to remove all particulate matter from the fluid before it reaches the pump 16.

In some embodiments, as shown in FIGS. 1-3, the system 10 can include a pre-filter assembly 52. The pre-filter assembly 52 can be located within the housing cavity 26 on top of the filter cartridge 14. In addition, the housing inlet 18 can be located near a top portion of the housing 12 adjacent to the pre-filter assembly 52 so that fluid entering the housing cavity 26 can first enter a pre-filter region 54 of the pre-filter assembly 52 before reaching the unfiltered region 28. In one embodiment, as shown in FIGS. 1-3, the housing 12 can include a housing base 56 and the pre-filter assembly 52, acting as a housing cover assembly, can substantially cover the housing base 56. The housing outlet 20 can extend from the pump outlet 24 through the housing base 56, and the housing inlet 18 can be integral with the pre-filter assembly 52.

The pre-filter assembly 52 can include a solid bottom plate 58 and a cylindrical pre-filter element 60 coupled to and extending upward from the solid bottom plate 58. The solid bottom plate 58 can substantially cover the top of the filter cartridge 14 to enclose the filtered region 30 so that unfiltered fluid may only reach the filtered region 30 by passing through the filter cartridge 14. The cylindrical pre-filter element 60 can substantially separate the housing inlet 18 and the pre-filter region 54 from the unfiltered region 28 and can include a mesh that allows fluid to pass from the pre-filter region 54 into the unfiltered region 28 and prevents large debris (e.g., leaves, rocks, etc.) from passing into the unfiltered region 28. As a result, the large debris, which can be relatively heavy, can settle onto the solid bottom plate 58. A housing cover 62 can be positioned over the pre-filter assembly 52 in order to enclose the pre-filter region 54. In some embodiments, the housing cover 62 can be removable so that the large debris captured in the pre-filter region 54 can be emptied out of the pre-filter assembly 52.

Figure 5:
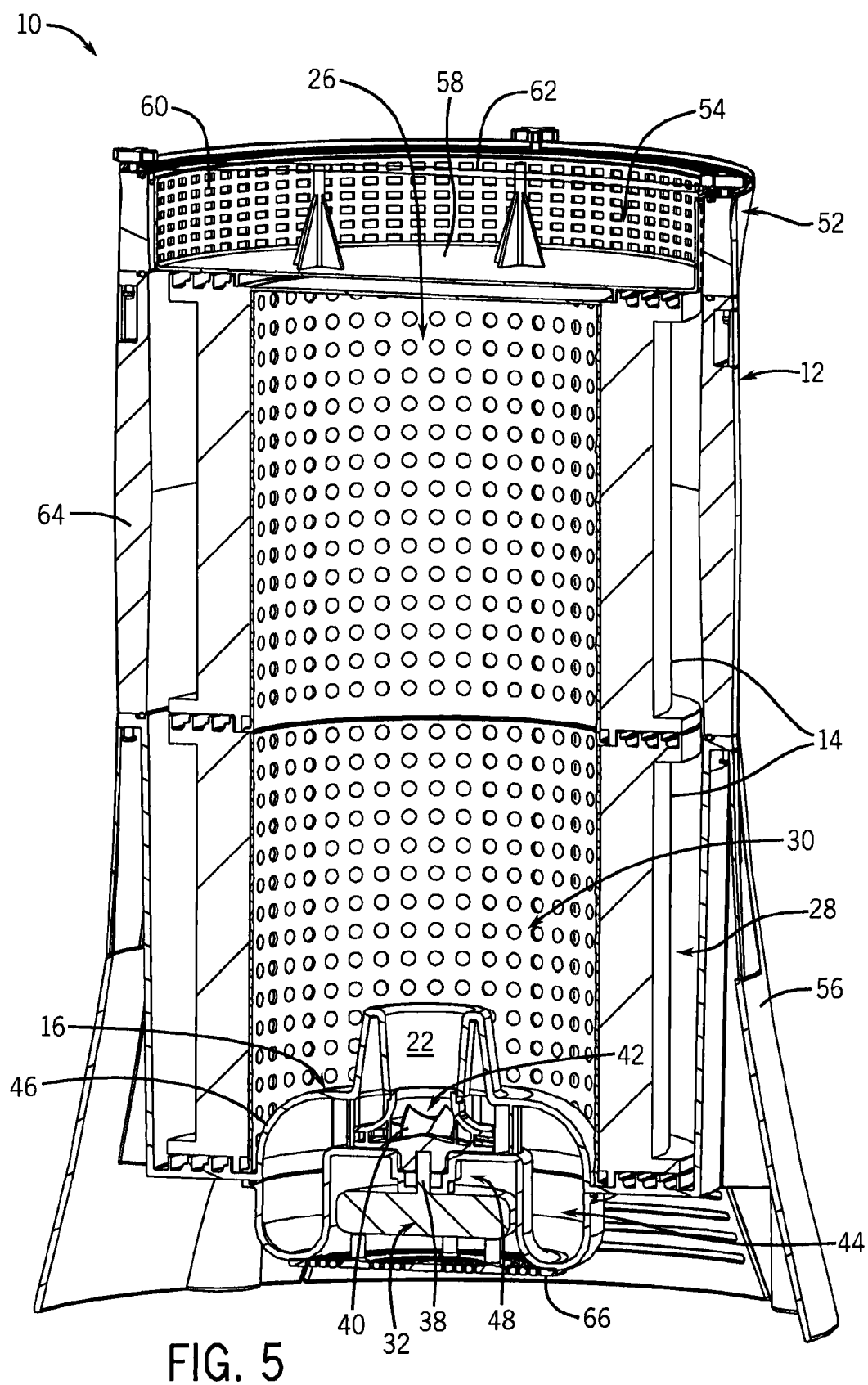
FIG. 5 is a cross-sectional view of a pump and filter system according to another embodiment of the invention.
Figure 6:
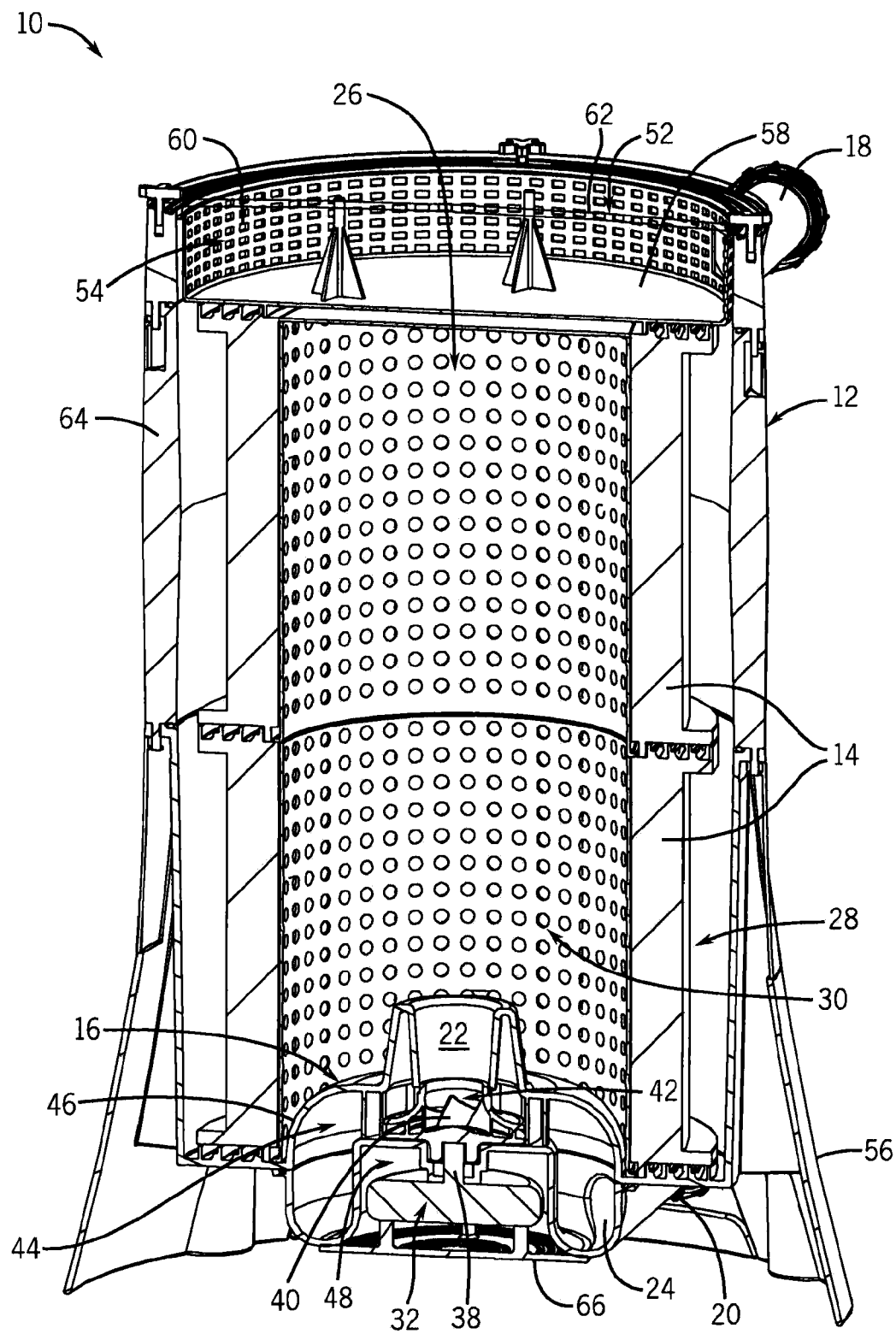
FIG. 6 is another cross-sectional view of the pump and filter system of FIG. 5.
Figure 7:
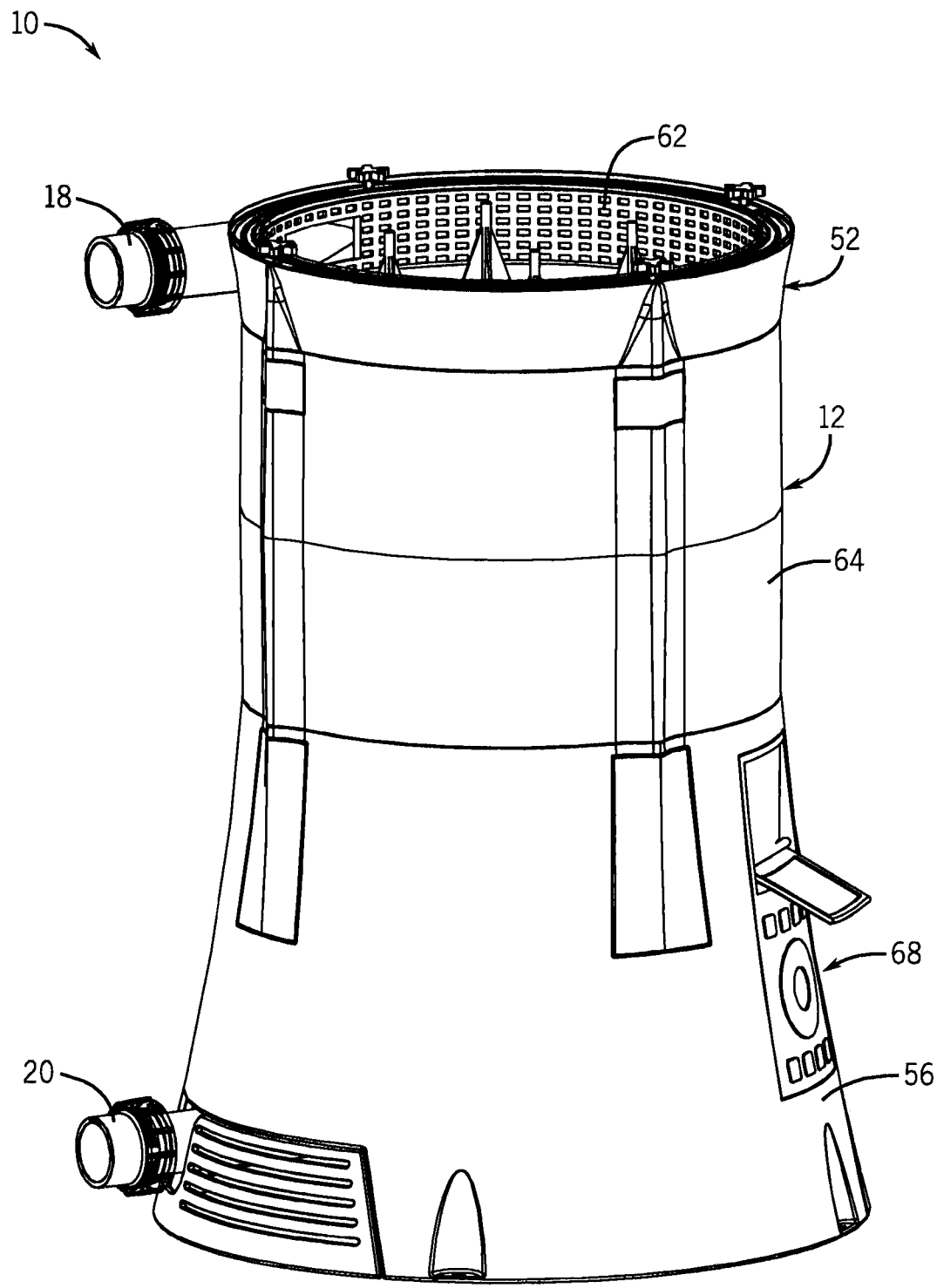
FIG. 7 is a perspective view of the pump and filter system of FIG. 5.
Figure 8:
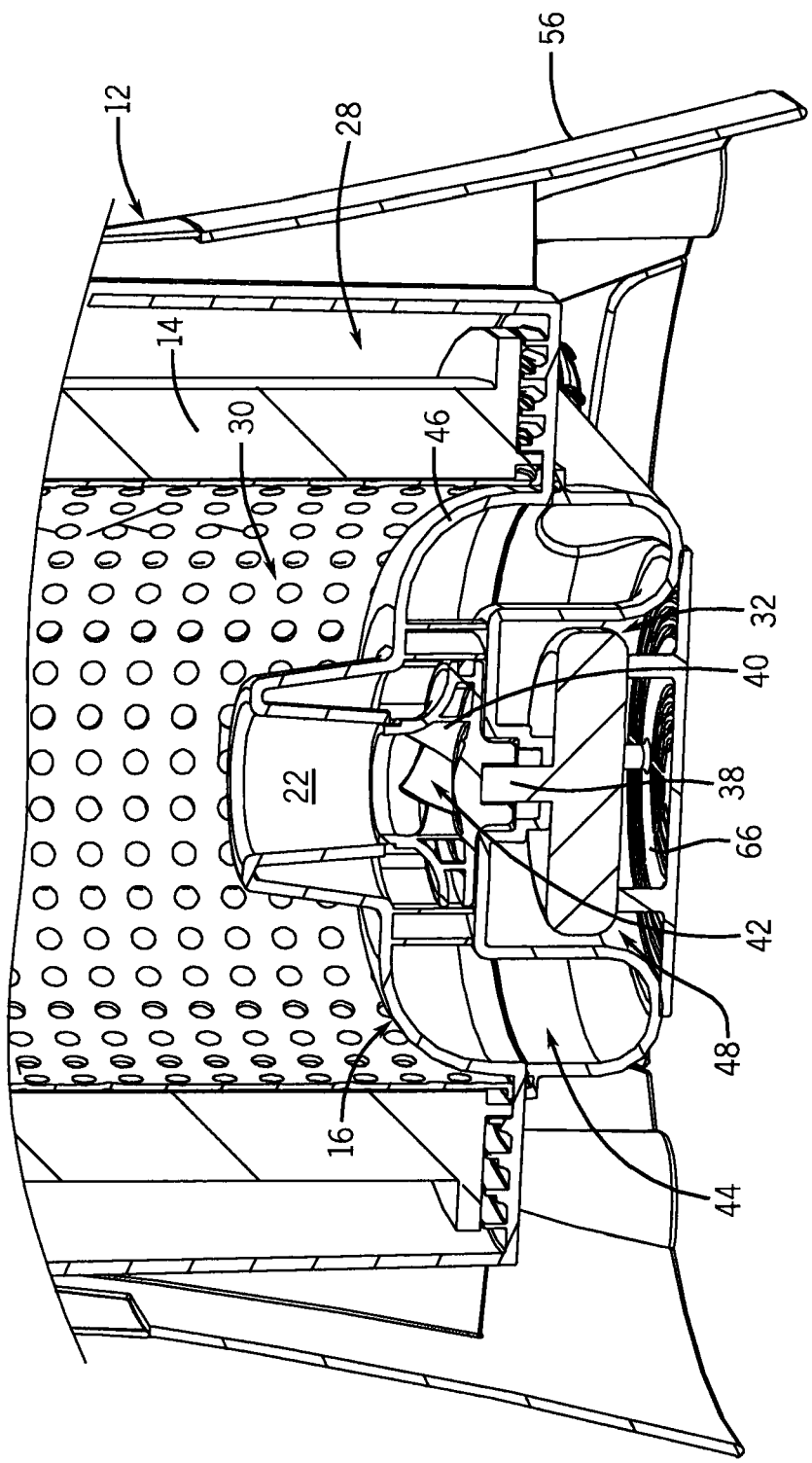
FIG. 8 is a cross-sectional view of a pump for use with the pump and filter system of FIG. 5.

The system 10 can be compact in comparison to conventional filtration systems due to the pump 16 being positioned inside the filter cartridge 14 and both the pump 16 and the filter cartridge 14 being housed within the same housing cavity 26. In addition, in some embodiments, the system 10 can be modular to accommodate different sized aquatic applications. As shown in FIGS. 5-7, the system 10 can accommodate larger aquatic applications by including a second filter cartridge 14 stacked on top of a first filter cartridge 14. The pump system 10 can also include a housing insert 64 positioned between the housing base 56 and the pre-filter assembly 52 in order to increase the height of the housing 12, and thus, increase the volume of the housing cavity 26. For example, the system 10 of FIGS. 1-3 can provide a filter cartridge surface area of about 100 square feet or about 150 square feet (e.g., accommodating a pool between about 10,000 gallons and about 15,000 gallons), and the system 10 of FIGS. 5-7 can provide a filter cartridge surface area of about 200 square feet or about 300 square feet (e.g., accommodating a pool between about 15,000 gallons and about 20,000 gallons). In addition, in some embodiments, as shown in FIGS. 5, 6, and 8, the motor cavity 32 can be enclosed by a cover 66.

In some embodiments, the system 10 can include different types of filter cartridges 14, such as a sheet-type filter cartridge 14, which substantially splits the housing cavity 26 into the unfiltered region 28 (i.e., adjacent to and in fluid communication with housing inlet 18) and the filtered region 30 (i.e., adjacent to and in fluid communication with the housing outlet 20). In these embodiments, the pump 16 is positioned in the filtered region 30 in order to create a suction pressure in the filtered region 30 that causes fluid entering the system 10 in the unfiltered region 28 to flow across the filter cartridge 14 to the filtered region 30.

In some embodiments, as shown in FIG. 7, the system 10 can include a controller assembly 68 to receive user input, control the pump 16, and/or display information and settings to a user. The controller assembly 68 can be located along the base 56 so that it is easily accessible by the user.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A pump and filter system comprising:
   a housing including a housing inlet, a housing outlet, and a housing cavity;
   a filter cartridge positioned within the housing cavity, the filter cartridge substantially splitting the housing cavity into an unfiltered region adjacent to the housing inlet and a filtered region adjacent to the housing outlet; and
   a pump positioned within the filtered region of the housing cavity, the filter cartridge surrounding an inlet of the pump and a portion of a motor of the pump.

2. The system of claim 1, wherein the housing inlet is in fluid communication with the unfiltered region of the housing cavity.

3. The system of claim 1, wherein the pump includes a pump outlet in fluid communication with the housing outlet.

4. The system of claim 1, wherein the motor includes a rotor and a stator, and an impeller is coupled to the rotor, and wherein at least the impeller is in fluid communication with the housing cavity and at least the stator is substantially sealed from the housing cavity.

5. The system of claim 1, wherein the housing inlet is positioned substantially above the housing outlet.

6. The system of claim 1, and further comprising a pre-filter element between the housing inlet and the unfiltered region.

* * * * *